Sept. 12, 1950 J. A. M. LECARME 2,522,284
MECHANICAL DEVICE FORMING A CONTROL ASSEMBLY APPLICABLE
IN STEERING ELEMENTS, MORE PARTICULARLY
AS USED IN AIRCRAFT CONSTRUCTION
Filed Oct. 30, 1946 2 Sheets—Sheet 1
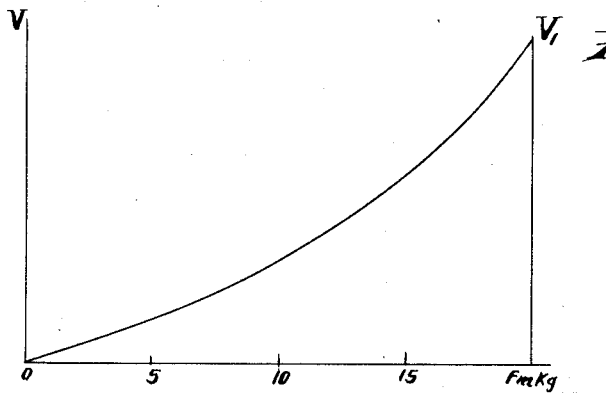
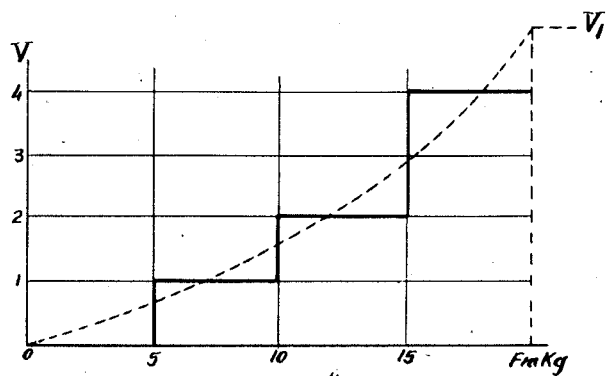
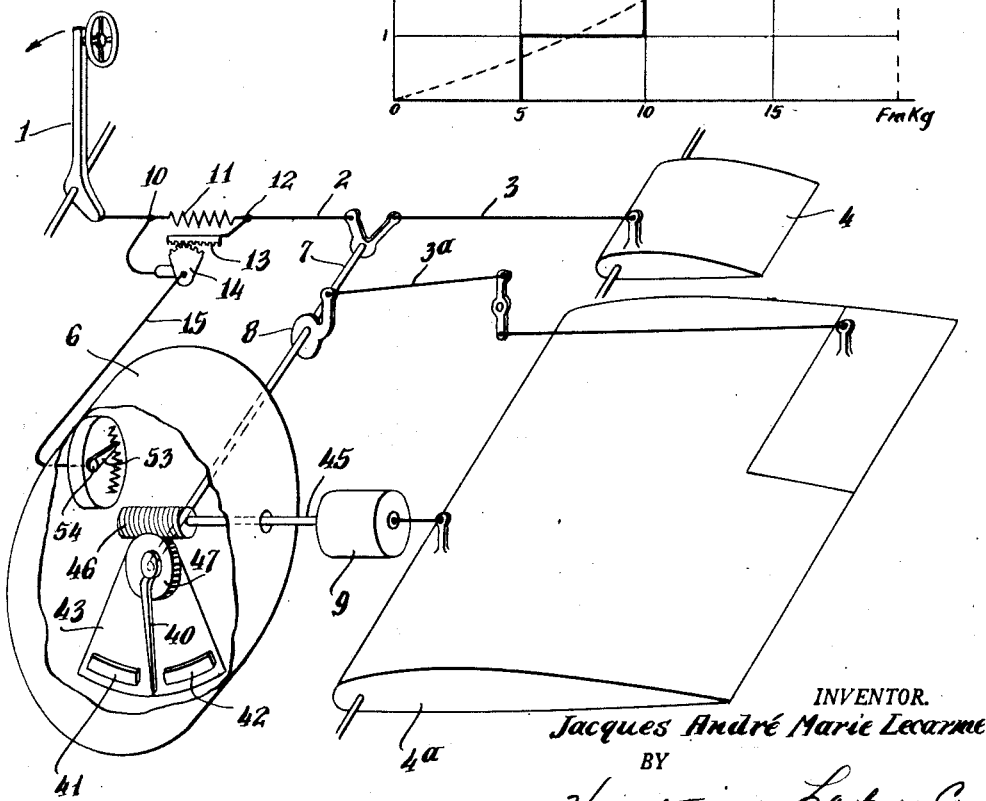
INVENTOR.
Jacques André Marie Lecarme
BY
Hazeltine, Lake & Co.
AGENTS Sept. 12, 1950   J. A. M. LECARME   2,522,284
MECHANICAL DEVICE FORMING A CONTROL ASSEMBLY APPLICABLE
IN STEERING ELEMENTS, MORE PARTICULARLY
AS USED IN AIRCRAFT CONSTRUCTION
Filed Oct. 30, 1946   2 Sheets-Sheet 2
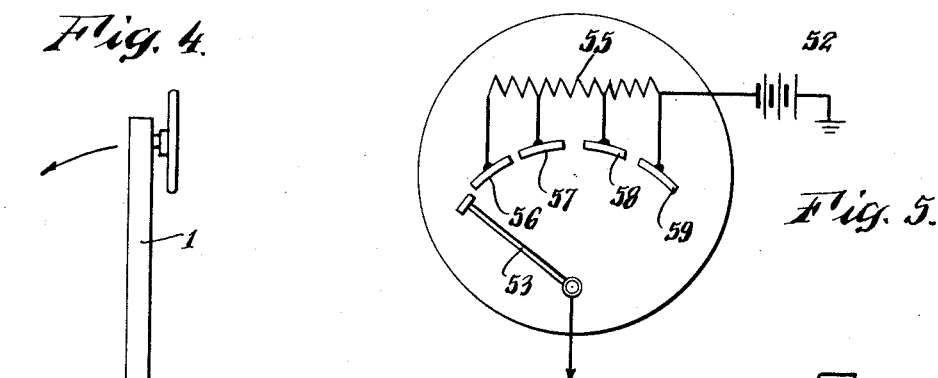
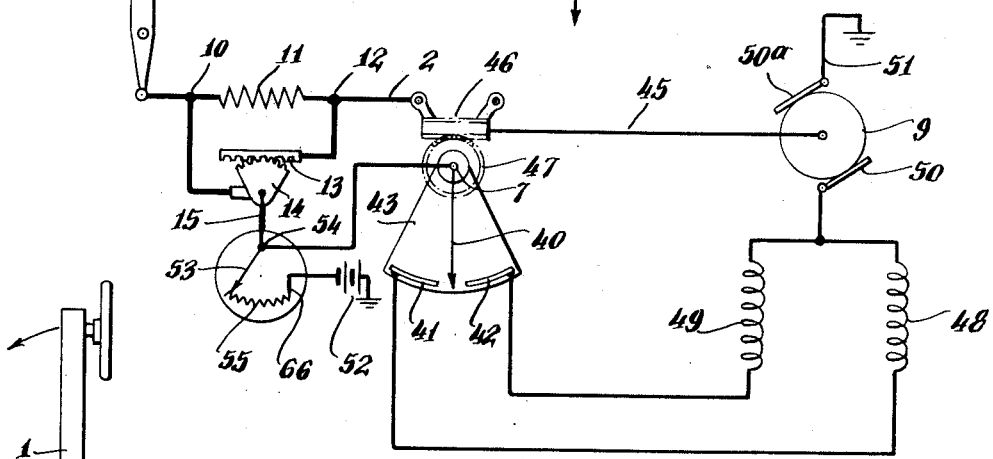
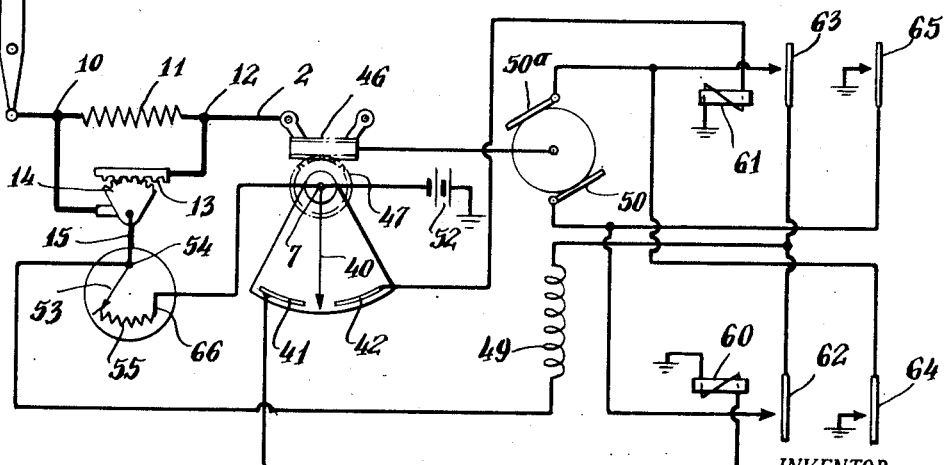
INVENTOR.
Jacques André Marie Lecarme
BY
Haseltine, Lake & Co.
AGENTS.

Patented Sept. 12, 1950

2,522,284

UNITED STATES PATENT OFFICE 2,522,284

MECHANICAL DEVICE FORMING A CONTROL ASSEMBLY APPLICABLE IN STEERING ELEMENTS, MORE PARTICULARLY AS USED IN AIRCRAFT CONSTRUCTION

Jacques André Marie Lecarme, Aix-en-Provence, France, assignor to Societe Anonyme: Societe Nationale de Constructions Aeronautiques du Sud-Est, Paris, France Application October 30, 1946, Serial No. 706,770
In France January 16, 1946

8 Claims. (Cl. 244—83)

The present invention relates to devices for steering control surfaces, and more particularly with such control surfaces as used in aircraft. With a view to provide the pilot, whatever the tonnage and the speed of the airplane controlled by him, with the same physical sensation as if he were piloting a small sized craft, it has been proposed to divide a control surface in at least two portions, one of which, of small dimensions, is directly actuated by the pilot, while the remaining portion or portions have much larger dimensions and are actuated by power means or servo-motors the displacements of which are operatively coupled to those of the first portion.

For such control surfaces it has been also proposed to render the movement of the servo-controlled surface as a function as to its amplitude, of that of the pilot control surface, and also as to its speed, of the stress exerted on the latter. The speed of the movement of the servo-operated control surface could vary in response to the stress exerted on the pilot surface, either continuously or discontinuously, in which latter case there could even be provided a step corresponding to zero.

The present invention has for its main object to provide a mechanical device forming a control assembly applicable in steering devices more particularly as used in aircraft comprising a manually operated pilot surface and a servo-operated main surface under the control of the pilot surface, the movement of said servo-operated main surface having an amplitude which is a function of that of the movement of the pilot surface and an operative speed which is a function of the stress exerted on the latter, said device comprising the combination of a double control system for the servo-motor actuating the servo-controlled surface, one control system being subject to the control of the pilot control surface for defining the direction of rotation of the servo-motor and the amplitude of its movement, the other control system being subject to a dynamometer measuring the stress exerted on the pilot control surface for defining at each moment the speed of the servo-motor.

This invention includes within its scope all forms of embodiment of such combination, which may differ from each other particularly by the kind of servo-motor used and the source of power by which the same is supplied as well as by the control means derived therefrom. Thus, the servo-motor may in particular be electric, pneumatic or hydraulic.

Another object of the invention is to provide a double control system of the character described wherein the control member for the pilot control surface actuates simultaneously one of the elements of the power distributor controlling the direction and the amplitude of the movement of the servo-motor, the second element of said distributor being itself movable in response to such movement.

Another object of the invention is to provide a double control system of the character described wherein the flow of power directed by the distributor previously runs through a control member connected with the dynamometer measuring the stress exerted on the pilot control surface.

A further object of the invention is to provide a double control system of the character described wherein the control applied by the dynamometer on said flow of power is applied to one of those physical characteristics of which the speed of the servo-motor is a function, e. g. the rate of flow.

The appended drawing illustrates, by way of example only and diagrammatically, two forms of embodiment of this invention. In the drawings:

Figs. 1 and 2 are explanatory diagrams.

Fig. 3 shows diagrammatically an embodiment of a double control according to the invention.

Fig. 4 is a diagram of a first form of embodiment of the device controlling the servo-motor operating the control surface.

Fig. 5 relates to a modification.

Fig. 6 is a diagram of a second form of embodiment.

Referring to the diagrams of Figs. 1 and 2, there are indicated as abscissae the stresses F exerted on the pilot control surface, and as ordinates the speeds V of the movements of the servo-operated control surface.

In Fig. 1, the speeds V limited to a maximum value $V_1$, vary continuously as a function of the stresses F. In the case of Fig. 2, on the contrary, the speeds V vary discontinuously and step by step, the first step corresponding moreover in this example to a zero value of V.

It has been assumed, in the example shown in Fig. 2, that for each five kilogram increase of the stress F, from 0 to 20 kilograms, the values of speed V step successively from 0 to 1, to 2, and to 4. But it will of course be understood that any other law of variation could be selected.

In the diagram of Figure 3 a lever 1 directly subjected to the action of the pilot transmits its displacements to the pilot control surface 4 by means of controls 2 and 3 and rotates the shaft 7 which, through clutch 8, controls the device 6, the forms of embodiment of which will be described below. Said device controls the direction of operation and the rate of flow of the driving force admitted to the servo-motor 9 controlling the large-area control surface 4a. The shaft 7 also controls, through a linkage 3a, the flap V pivoted on the control surface.

Between lever 1 and control 2 is inserted a dynamometer 11 deformable according to the stresses exerted by lever 1. Said deformations are analysed between 10 and 12 by means of a rack 13 connected to 12 and engaging a toothed sector 14 mounted on a support connected to 10. The length variations between the points 10 and 12 induce relative displacements between the rack 13 and the toothed sector 14 and consequently rotations of said sector. Said rotary movements are transmitted to the device 6 through a flexible control 15 which actuates the rotatable contact arm 53 provided in the devices illustrated in Figs. 4, 5 and 6.

As illustrated in Fig. 4, the device 6 is constituted, by the combination of a two-fold system controlling the servo-motor. One of said systems is formed in a way well known per se by a contact arm 40 connected with the control lever 1 of the pilot control surface 4 by means of shaft 7 and which co-operates with two contact segments 41 and 42 mounted on a casing 43 freely rotatable on said shaft 7. Casing 43 is rotated by motor 9 through any type of kinematic transmission such as shown by way of example in the form of a shaft 45, worm 46 and worm gear 47 fixed on casing 43.

Contact segment 41 is connected to one end of the field winding 48, while contact segment 42 is connected to one end of field winding 49. The opposite ends of said fields 48 and 49 are connected with one of the brushes 50 of the collector, while the other brush 50a is for example grounded at 51, or more generally connected to the free terminal of the power supply.

The second control system for the servo-motor is formed by a contact arm 53, rotatable about the axis 54 under the action of the flexible control 15 connected with dynamometric system measuring the stress applied to the pilot control surface 4, said contact arm 53 co-operating with a resistance 55 connected with the battery 52, while the contact arm 53 is electrically connected with the contact arm 40.

Said device operates as follows:

In the absence of any movement imparted to the pilot control surface 4 by the operating lever 1, the contact arm 53 is in a position such that the totality of resistance 55 is included in the circuit of motor 9; the arrangement may even be such that the contact arm 53 does not contact the free end of said resistance 55. On the other hand, the contact arm 40 faces the separation between segments 41 and 42. The circuit for motor 9 is thus open.

If lever 1 is rotated in the direction of the arrow f, exerting on the pilot control surface 4 a certain stress measured by the dynamometer, contact arm 40 driven by shaft 7, after a certain angular displacement which, as the case may be, can be very small or on the contrary appreciable, engages segment 42. On the other hand, assuming that the stress applied to the pilot control surface 4 is low, the dynamometer brings the contact arm 53 by means of flexible control 15 to a position wherein almost the entire resistance 55 is included in the circuit.

The following circuit is then established: Battery 52—the entire or substantially the entire resistance 55—slider 53—contact arm 40—contact segment 42—field winding 49—armature 9 and ground at 51. The motor 9 is therefore started at low speed in a direction corresponding to the movement to be imparted to the main control surface 4a. If the movement of lever 1 had been in the opposite direction, the contact arm 40 would have engaged segment 41, so that field winding 48 would have been put into circuit instead of field winding 49 and consequently motor 9 would have been rotated in reverse direction.

The rotation of motor 9 is transmitted to the main surface 4a and simultaneously by gears 46—47 to the casing 43 which is rotated in a direction such that the separation between segments 41 and 42 tends once more to come and face the contact arm 40, as to break the circuit of the motor and thereby link the amplitude of the motion of the latter to correspond with that of the lever 1. But during the rotation of motor 9, the stress exerted on lever 1 may vary, independently even from the amplitude of the angular displacement imparted to said lever 1. In that case, the dynamometer acts by means of flexible control 15 on the contact arm 53 so as to modify the resistance connected in series in the circuit of the motor and consequently the speed of the motor. The law of variations of the speed of course depends on the manner in which resistance 55 is formed; in that respect all combinations are possible. The variations may be continuous if the contact arm 53 directly engages resistance 55 so as to obtain a law similar to the one represented in Fig. 1; it may also be discontinuous by using for instance the device of Fig. 5; in that case, various points of the resistance are connected to contact segments 56, 57, 58 and 59, while the contact arm 53 has a sliding end the length of which is greater than the gap between the conductive segments so as to avoid any breaking of the circuit. There is obtained in this way a law of step by step variation as indicated in Fig. 2.

It is not necessary to use a motor having two fields. In the example shown in Fig. 6, the conductive segments 41 and 42 are respectively connected to the winding of relays 60 and 61, while the arm 40 is directly connected to the battery 52. Arm 53 is connected to field winding 49, the other end of which is connected to contacts 62 and 63 of relays 60 and 61. The operative contacts of 62 and 63 are respectively connected to brushes 50 and 50a which are also connected to contacts 64 and 65 of relays 60 and 61. The operative contacts of 64 and 65 are grounded.

It will be seen that the connections provided by the energization of relay 60 are the reverse of those established by the energization of relay 61. In fact, assuming relay 60 is energized, it will be seen that field winding 49 is connected to brush 50 through contact 62 operative, while brush 50a is grounded through contact 64 operative; on the contrary, if relay 61 is energized, field winding 49 is connected to brush 50a through contact 63 operative, while brush 50 is grounded.

Consequently, contact arm 40 and segments 41 and 42 act as a reversing switch. Control of the speed of motor 9 is provided as previously through resistance 52 and arm 53.

The maximum speed $V_1$ is reached when resistance 55 is completely shunted out of the circuit, arm 53 then sliding along the conductive segment 66 the resistance of which is nil, said segment corresponding to segment 59 in Fig. 5,

What I claim as my invention and desire to secure by Letters Patent is:

1. In an aircraft having a main control surface of relatively large dimensions and a laterally disposed supplemental control surface of relatively small dimensions distinct from said main surface, manual control means connected with said supplemental control surface for actuating the same, a power means connected with said manual control means and said main control surface for actuating said main surface according to the actuation of said manual means and the stress exerted thereon, and a control system interposed between said manual means and said power means and comprising a first means connected with said manual means and said power means for correspondingly determining the amplitude and the direction of their movements, a dynamometer means interposed between said manual means and said supplemental control surface responsive to the stress exerted on said manual means, and a second means connected with said dynamometer means and said power means for determining the rate of movement of said power means according to the stress exerted on said manual means.

2. In an aircraft, a power-operable main control surface element of relatively large dimensions, a manually operable laterally disposed supplemental control surface element of relatively small dimensions, manual control means connected with said supplemental surface element, power means connected with said main surface element, and a control system comprising a first regulating means interposed between said manual and said power means and adapted to regulate the movement of said power means in direction and amplitude in response to the direction and amplitude of a movement of said manual means, a dynamometer means interposed between said manual means and said supplemental surface element responsive to the amount of stress applied to said manual means, and a second regulating means interposed between said dynamometer means and said power means and adapted to regulate the movement of said power means as to the rate thereof in response to the deformation of said dynamometer means.

3. In an aircraft, a power-operable main control surface element of relatively large dimensions, a manually operable laterally disposed supplemental control surface element of relatively small dimensions, manual control means connected with said supplemental surface element, power means connected with said main surface element, and a power distributing means comprising a first regulating means, adapted to regulate the movement of said power means in direction and amplitude in response to the direction and amplitude of a movement of said manual means, having a first element connected with said manual means and movable in response to the amplitude and direction of the movement thereof and a second element connected with said power means and associated with said first element for controlling the amplitude and direction of the movement of said power means in response to the amplitude and direction of the movement of said first element, a dynamometer means interposed between said manual means and said supplemental surface element responsive to the amount of stress applied to said manual means, and a second regulating means interposed between said dynamometer means and said power means and adapted to regulate the movement of said power means as to the velocity thereof in response to the deformation of said dynamometer means.

4. In an aircraft, a power-operable main control surface element of relatively large dimensions, a manually operable laterally disposed supplemental control surface element of relatively small dimensions, manual control means connected with said supplemental surface element, a prime mover connected with said main element, a source of power for said prime mover, circuit connections between said source and said prime mover comprising two distinctly energizable circuits, the first of which when operative is adapted to cause said prime mover to rotate in one direction and the second to cause said rotation in reverse direction, reversing means connected with said manual means for selectively energizing either of said circuits according to the direction of movement of said manual means and for a duration corresponding to the amplitude of said movement, dynamometer means interposed between said manual control means and said supplemental surface element responsive to the amount of stress applied to said manual control means, and regulating means interposed between said power source and said reversing means, connected with said dynamometer means and adapted to regulate the rate of flow of energy from said source to said prime mover in response to the deformation of said dynamometer means.

5. In an aircraft, a power-operable main control surface element of relatively large dimensions, a manually operable laterally disposed supplemental control surface element of relatively small dimensions, manual control means connected with said supplemental surface element, a prime mover connected with said main element, a source of power for said prime mover, circuit connections between said source and said prime mover comprising two distinctly energizable circuits, the first of which when operative is adapted to cause said prime mover to rotate in one direction and the second to cause said rotation in reverse direction, reversing means connected with said manual means for selectively energizing either of said circuits according to the direction of movement of said manual means and for a duration corresponding to the amplitude of said movement, dynamometer means interposed between said manual control means and said supplemental surface element responsive to the amount of stress applied to said manual control means, and regulating means interposed between said power source and said reversing means connected with said dynamometer means and adapted to adjust a physical characteristic of the energy flowing from said source to said prime mover for thereby adjusting the rate of operation of said prime mover in response to the deformation of said dynamometer.

6. In an aircraft, a power-operable main control surface element of relatively large dimensions, a manually operable laterally disposed supplemental control surface element of relatively small dimensions, manual control means connected with said supplemental surface element, an electric motor connected with said main element for operating the same, a source of electric power for said motor, circuit connections between said source and said motor comprising two distinctly energizing circuits for said motor, the first of which when operative is adapted to cause said motor to rotate in one direction and the second to cause said rotation in reverse direction, reversing switch means connected with said manual means for selectively energizing either of said circuits according to the direction of movement of said manual means and for a duration corresponding to the amplitude of said movement, dynamometer means interposed between said manual control means and said supplemental surface element responsive to the amount of stress applied to said manual control means, and a variable resistor common to both said circuits, provided with a resistance interposed between said power source and said reversing switch means and with a contact arm mechanically connected with said dynamometer means, and adapted to regulate the amplitude of energizing current flowing to said motor in response to the deformation of said dynamometer means.

7. In an aircraft, a power-operable main control surface element of relatively large dimensions, a manually operable laterally disposed supplemental control surface element of relatively small dimensions, manual control means connected with said supplemental surface element, a series wound electric motor connected with said main element for operating the same, a source of electric power for said motor, two circuit connections between said source and said motor comprising two field windings for said motor one in each of said circuits, the first of which when energized is adapted to cause said motor to rotate in one direction and the second to cause said rotation in reverse direction, reversing switch means connected with said manual means for selectively energizing either of said field windings, according to the direction of movement of said manual means and for a duration corresponding to the amplitude of said movement, dynamometer means interposed between said manual control means and said supplemental surface element responsive to the amount of stress applied to said manual control means, and a variable resistor common to both said circuits, provided with a resistance interposed between said power source and said reversing switch means and with a contact arm mechanically connected with said dynamometer means, and adapted to regulate the amplitude of energizing current flowing to said motor in response to the deformation of said dynamometer means.

8. In an aircraft, a power-operable main control surface element of relatively large dimensions, a manually operable laterally disposed supplemental control surface element of relatively small dimensions, manual control means connected with said supplemental surface element, an electric motor provided with a field winding and connected with said main element for operating the same, a source of electric power for said motor, two circuit connections between said source and said field winding provided with two distinctly energizable elements one in each of said circuits, the first of which when energized is adapted to cause said motor to rotate in one direction and the second to cause said rotation in reverse direction, reversing switch means mechanically connected with said manual means and electrically connected with said source for selectively energizing either of said elements according to the direction of movement of said manual means and for a duration corresponding to the amplitude of said movement, dynamometer means interposed between said manual control means and said supplemental surface element responsive to the amount of stress applied to said manual control means, and a variable resistor provided with a resistance interposed between said field winding and said reversing switch means and with a contact arm mechanically connected with said dynamometer means, and adapted to regulate the amplitude of energizing current flowing to said motor in response to the deformation of said dynamometer means.

JACQUES ANDRÉ MARIE LECARME.

REFERENCES CITED

The following references are of record in the file of this patent:

UNITED STATES PATENTS

| Number | Name | Date |
|---|---|---|
| 2,183,932 | Carlson | Dec. 19, 1939 |
| 2,272,725 | Overbeke | Feb. 10, 1942 |
| 2,325,548 | Roos | July 27, 1943 |
| 2,395,671 | Kleinhans | Feb. 26, 1946 |

FOREIGN PATENTS

| Number | Country | Date |
|---|---|---|
| 221,794 | Switzerland | Sept. 16, 1942 |